United States Patent Office 3,282,897
Patented Nov. 1, 1966

3,282,897
PROCESS FOR PREPARING A POLYAMIDE-ESTER
Rudolph J. Angelo, Wilmington, Del., assignor to E. I. du Pont de Nemours and Company, Wilmington, Del., a corporation of Delaware
No Drawing. Filed Sept. 25, 1963, Ser. No. 311,326
7 Claims. (Cl. 260—47)

This invention relates to the preparation of aromatic polyimide articles and coatings. More particularly, it relates to the preparation of relatively stable intermediates that can be easily converted to the polyimides when desired.

The importance of relatively stable intermediates that can be easily converted to the final desired product can be appreciated by one skilled in the art. The final products, the aromatic polyimides, are known for their chemical and thermal stability. Since they do not melt easily nor dissolve easily, the difficulty of shaping this polymer into useful articles is a serious obstacle to commercial development. Recently, processes utilizing the shaping of a polyamide-acid intermediate followed by conversion to the polyimide have been proposed. However, the polyamide-acids, in many cases, tend to convert to polyimides during storage or, in some cases, are of high stability, converting only upon exposure to temperatures which are extremely high for organic materials.

It is an object of this invention to provide intermediates that are sufficiently stable to be stored for long periods, yet sufficiently "unstable" to convert relatively easily to polyimide when desired. Other objects will appear hereinafter.

The objects are accomplished by the use of an intermediate linear polymer, an aromatic polyamide-ester having the formula:

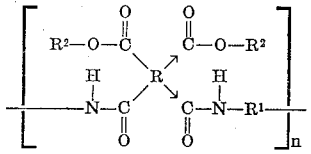

wherein the arrows denote isomerism; [1]

R is an aromatic tetravalent organic radical;
$R^1$ is arylene;
$R^2$ is lower alkyl (methyl, ethyl, propl, butyl, amyl) or substituted methyl which has been substituted with an unsaturated group (vinyl, phenyl); and
$n$ is an integer sufficiently high to provide a film-forming polymer, i.e. having an inherent viscosity at 30° C. of at least 0.1, preferably 0.3–5.0, as measured as a 0.5% solution in a suitable solvent (concentrated sulfuric acid, N,N-dimethylacetamide, etc.).

The process for producing such polyamide-esters involves the formation of a polyamide-acid salt having the following formula:

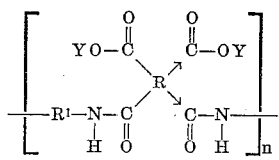

Y being the Group I metal ion;

by first reacting an aromatic dianhydride and an aromatic diamine under conditions to form a polyamide-acid followed by treatment with a metal salt of the following

[1] In any recurring unit the groups to which arrows point may exist as shown or in interchanged position.

Group I [2] metals; silver, lithium, cesium, rubidium, potassium and sodium; and monocarboxylic or polycarboxylic acids. This is followed by the treatment of the salt, preferably in solution, with an alkyl or other halide identified hereinafter to form the polyamide-ester.

The first step, the preparation of the polyamide-acid composition, involves reacting at least one aromatic diamine having the structural formula $H^2N—R_1—NH_2$ with at least one tetracarboxylic acid dianhydride having the structural formula

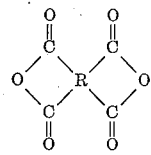

wherein R is a tetravalent aromatic radical and $R^1$ is arylene, in an organic solvent for at least one of the reactants, the solvent being inert to the reactants, preferably under anhydrous condtions, for a time and at a temperature sufficient to provide the polyamide-acid:

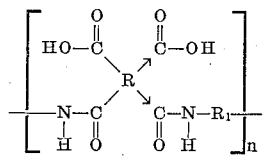

It should be understood that it is not necessary that the polymeric component of the composition be composed entirely of the polyamide-acid. This is particularly true since conversion to the polyimide is contemplated subsequently. For purposes of this invention, it has been found that in most instances the polymeric component of the composition should contain at least 50% of the polyamide-acid; and, in a few instances, less than 50% of the polyamide-acid in the polymeric component will operate.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the precentage of polyamide-acid desired in the final composition and the minimum period of time that one desires for the reaction. For most combinations of diamines and dianhydrides falling with the definitions given above, it is possible to form compositions of 100% polyamide-acid by conducting the reaction below 100° C. However, temperatures up to 175° C. may be tolerated to provide acceptable compositions. The particular temperature below 175° C. that must not be exceeded for any particular combination of diamine, dianhydride, solvent and reaction time to provide a reaction product composed of the desired minimum of polyamide-acid will vary but can be determined by a simple test by any person of ordinary skill in the art. However, to obtain the maximum inherent viscosity, i.e. maximum degree of polymerization, for any particular combination of diamine, dianhydride, solvent, etc., and thus produce ultimately shaped articles such as films and filaments of optimum toughness, it has been found that the temperature throughout the reaction should be maintained below 60° C., preferably below 50° C.

The degree of polymerization of the polyamide-acid is subject to deliberate control. The use of equal molar amounts of the reactants under the prescribed condi-

[2] Group I of Mendeleef's Periodic Table of the Elements. Handbook of Chemistry and Physics (25th ed.), published bv Chemical Rubber Publishing Co.

tions provides polyamide-acids of very high molecular weight. The use of either reactant in large excess limits the extent of polymerization. Besides using an excess of one reactant to limit the molecular weight of the polyamide-acid, a chain terminating agent such as phthalic anhydride may be used to "cap" the ends of the polymer chains.

In the preparation of the polyamide-acid, it is essential that the molecular weight be such that the inherent viscosity of the polymer is at least 0.1, preferably 0.3–5.0. The inherent viscosity is measured at 30° C. at a concentration of 0.5% by weight of the polymer in a suitable solvent, e.g. N,N-dimethylacetamide. To calculate inherent viscosity, the viscosity of the polymer solution is measured relative to that of the solvent alone.

$$\text{Inherent viscosity} = \frac{\text{natural logarithm} \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the process need only be sufficient to dissolve enough of one reactant, preferably the diamine, to initiate the reaction of the diamine and the dianhydride. It has been found that the most successful reults are obtained when the solvent represents at least 60% of the final solution. That is, the solution should contain 0.05–40% of the polymeric component.

The starting materials for forming the polyamide-acids are aromatic diamines and aromatic tetracarboxylic acid dianhydrides. The organic diamines are characterized by the formula:

$$H_2N-R^1-NH_2$$

wherein $R^1$ is a divalent aromatic radical (arylene), preferably selected from the following groups: phenylene, naphthylene, biphenylene, anthrylene, furylene, benzfurylene and wherein $R^3$ is selected from the group consisting of an alkylene chain having 1–3 carbon atoms, $$-O-, -S-, SO_2-, -\overset{O}{\underset{\|}{C}}-\overset{R^4}{\underset{|}{N}}-, -\overset{O}{\underset{\|}{C}}-O-, -\underset{\underset{R^5}{|}}{\overset{R^4}{\underset{|}{N}}}-, -\underset{\underset{R^5}{|}}{\overset{R^4}{\underset{|}{Si}}}-$$

$$-O-\underset{\underset{R^5}{|}}{\overset{R^4}{\underset{|}{Si}}}-O-, -\underset{\underset{O}{\|}}{\overset{R^4}{\underset{|}{P}}}-, \text{ and } -O-\underset{\underset{O}{\|}}{\overset{R^4}{\underset{|}{P}}}-O-$$

wherein $R^4$ and $R^5$ are alkyl or aryl, and substituted groups thereof. Among the diamines which are suitable for use in the present invention are: meta-phenylene diamine; para-phenylene diamine; 2,2-bis(4-amino-phenyl) propane; 4,4'-diamino-diphenyl methane; 4,4'-diamino-diphenyl sulfide; 4,4'-diamino-diphenyl sulfone; 3,3'-diamino-diphenyl sulfone; 4,4'-diamino-diphenyl ether; 2,6-diamino-pyridine; bis-(4-amino-phenyl) diethyl silane; bis-(4-amino-phenyl) diphenyl silane; benzidine; 3,3'- dichloro-benzidine; 3,3'-dimethoxy benzidine; bis-(4-amino-phenyl) ethyl phosphine oxide; bis-(4-amino-phenyl) phenyl phosphine oxide; bis-(4-amino-phenyl)-N-butyl-amine; bis-(4-amino-phenyl)-N-methylamine; 1,5-diami-no-naphthalene; 3,3'-dimethyl-4,4'-diaminobiphenyl; N-(3-aminophenyl)-4-aminobenzamide; 4 - aminophenyl-3-aminobenzoate; and mixtures thereof.

The aromatic tetracarboxylic acid dianhydrides are characterized by the following formula:

wherein R is a tetravalent aromatic radical, e.g.

wherein $R^6$ is selected from the group consisting of $R^3$ and $$-\overset{O}{\underset{\|}{C}}-$$

In these dianhydrides every carbonyl group is attached directly to a separate carbon atom of the aromatic radical, the carbonyl groups being in pairs, the groups of each pair being adjacent to each other. Adjacent means ortho or peri, so that the dicarboxylanhydro rings are 5- or 6-membered, respectively.

The preferred aromatic dianhydrides are those in which the carbon atoms of each pair of carbonyl groups are directly attached to ortho carbon atoms in the R group to provide a 5-membered ring as follows:

$$\begin{matrix} \overset{O}{\underset{\|}{C}}-O-\overset{O}{\underset{\|}{C}} \\ -\underset{|}{C}\rule{1em}{0.4pt}\underset{|}{C}- \end{matrix} \quad \text{or} \quad \begin{matrix} \overset{O}{\underset{\|}{C}}-O-\overset{O}{\underset{\|}{C}} \\ -C=\!\!=\!\!C- \end{matrix}$$

Illustrations of dianhydrides suitable for use in the present invention include:
pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
bis(3,4-dicarboxyphenyl) ether dianhydride;
naphthalene-1,2,4,5-tetracarboxylic dianhydride;
naphthalene-1,4,5,8-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
2,2-bis(2,3-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(3,4-dicarboxyphenyl) sulfone dianhydride;
benzene-1,2,3,4-tetracarboxylic dianhydride;
3,4,3',4'-benzophenone tetracarboxylic dianhydride;

2,3,2′,3′-benzophenone tetracarboxylic dianhydride;
2,3,3′,4′-benzophenone tetracarboxylic dianhydride;
pyrazine-2,3,5,6-tetracarboxylic dianhydride;
thiophene-2,3,4,5-tetracarboxylic dianhydride; etc.

The inclusion of one or more diamines or dianhydrides other than those disclosed, e.g. aliphatic diamines or aliphatic dianhydrides, as reactants in the process may detract from one or more desirable properties of the polymeric products. However, the inclusion of such materials, to the extent that they do not detract substantially from the desirable results obtained with the aromatic reactants, is contemplated.

The solvents useful in the solution polymerization process for synthesizing the polyamide-acid compositions are the organic solvents whose functional groups do not react with either of the reactants (the diamines or the dianhydrides) to any appreciable extent. Besides being inert to the system, and preferably, being a solvent for the polyamide-acid, the organic solvent should be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxyl-anhydro groups. The normally liquid organic solvents of the N,N-dialkylcarboxylamide class are useful as solvents in the process. The preferred solvents are the lower molecular weight members of this class, particularly N,N-dimethylformamide and N,N-dimethylacetamide. They may easily be removed from the polyamide-acid and/or polymeric shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used are: dimethylsulfoxide, N-methyl-2-pyrrolidone, tetramethyl urea, pyridine, dimethylsulfone, hexamethylphosphoramide, tetramethylene sulfone, formamide, N-methylformamide and butyrolactone. The solvents can be used alone, in combinations of solvents, or in combination with poor solvents such as benzene, benzonitrile, dioxane, xylene, toluene and cyclohexane.

In the next step, the polyamide-acid is converted to a polyamide-acid salt having the formula:

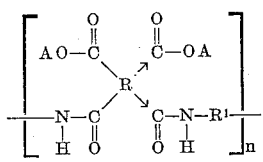

This is accomplished by adding a solution in an organic solvent of a Group I metal salt of an oxy acid of carbon. The metathetical reaction is permitted to take place while maintaining the temperature within a range of 0°–100° C. Slight warming, as on a steam bath, helps the reaction. The salts are those having as their negative ion, ions derived from monocarboxylic or polycarboxylic acids such as a fatty acid (e.g. formic, acetic, propionic, butyric, valeric or caproic acid), a dicarboxylic aliphatic acid (e.g., oxalic or succinic acid), an unsaturated acid (e.g., maleic or fumaric acid), an ether acid (e.g., diglycolic or dilactic acid), a hydroxy acid (e.g., tartaric or citric acid) or an aromatic acid (e.g., benzoic or phthalic acid), or the ion derived from carbonic acid.

The metal salt is preferably added as part of a solution in an organic solvent. The organic solvent is preferably the same as that used previously in the preparation of the polyamide-acid but may be any of those listed previously, which solvent is a solvent for the particular metal salt under consideration. If sufficient solvent were used in forming the polyamide-acid composition, then the metal salt in solid form may be added in this step.

In the formation of the metal salt of the polyamide-acid, rapid stirring and the addition of more solvent or pyridine or a beta-ketonic type compound such as ethyl acetoacetate are advised to clear any gel or insoluble matter that may form in the polyamide-acid salt solution.

The degree of substitution of metal for hydrogen achieved in this step depends upon the amount of metal salt added and the temperature and time permitted for the reaction. In the discussion in column 1, a substitution of 2 moles of metal per polymer unit was illustrated, i.e., 1 mole of metal per carboxyl unit of polyamide-acid. For purpose of the present invention, a substitution of 0.1 mole–2 moles of metal per polymer unit can be used successfully. Thus, the polymeric composition at this stage may be described as one comprising 0.05–15% by weight of at least one polyamide-acid salt having the recurring unit:

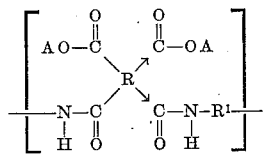

wherein A is selected from the group consisting of hydrogen and a Group I metal, the minimum substitution of metal per polymer unit being 0.1 mole, dissolved in 85–99.95% of an organic solvent; said polyamide-acid salt having an inherent viscosity of at least 0.1.

The polyamide-acid salt compositions may be used as such to form shaped articles, e.g. films, filaments or they may be converted to the corresponding polyamide-ester. Thus, in the next step of the process, the polyamide-acid salt composition is treated with the alkyl or other halide identified hereinafter. Examples of operable alkyl halides are methyl bromide, ethyl bromide, ethyl iodide, and other lower alkyl (propyl, butyl, amyl) chlorides, bromides and iodides. Examples of other operable halides are the chlorides, bromides and iodides of allyl and benzyl radicals such as allyl chloride, allyl bromide, allyl iodide, benzyl chloride, benzyl bromide, etc. The preferred groups are methyl, allyl and benzyl, while the preferred halide group from the standpoint of reactivity is bromide. Iodides react faster but sometimes cause undesired decomposition to troublesome by-products. Chlorides give the cleanest reactions, but they are more sluggish than the other two. Esterification may be conducted at a temperature of 0°–100° C., and is helped by warming, as on a steam bath.

The polyamide-ester composition may be stored at this point for later use or it may be immediately used to form shaped articles. After shaping the composition composed predominantly of the polyamide-ester either immediately or after storage or after sale, preferably still in the solvent (usually at least 60% solvent), into a useful article, e.g. filament, film, tube, rod, powder, etc., and drying the article, it is preferred to convert the polyamide-ester to another polymer to modify the properties of the shaped structure. Thus, the polyamide-ester may be converted by heat treatment to the corresponding polyimide, specifically by heating to a temperature of at least 125° C., preferably at least 150° C., to drive off alcohol. At 300° C. the conversion occurs in about 10 minutes. The polyimide has the following structural formula:

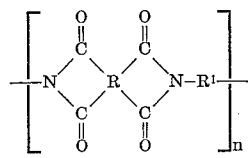

wherein

R is an aromatic tetravalent radical;
R¹ is arylene; and
$n$ is an integer sufficiently high to provide an inherent viscosity of at least 0.1, preferably 0.3–5.0, as measured as a 0.5% solution in a suitable solvent.

The final shaped article may consist of the polyimide alone or as a blend with other polymers and/or modified with inert materials. Depending on their nature, the inert materials may be added before or after shaping. For example, fillers such as pigments, electrically conductive carbon black and metal particles, abrasives, dielectrics and lubricating polymers may be added conveniently to the intermediate polymer as such or in a solution of the intermediate polymer before shaping. Certain abrasives and electrically conductive materials are better added as surface layers. A cellular form or foam of the final polymer may be produced by adding a conventional blowing agent to the intermediate polymer, either alone or in combination with a filler, followed by heating to decompose the agent and cyclize the polymer units. Alternatively, cellular products can be made by dispensing bubbles (of air, carbon dioxide, nitrogen, etc.) into a melt or solution of the intermediate polymer before shaping and cyclization.

Instead of being shaped itself, the intermediate polymer can be used as a coating composition. The liquid coating composition containing the polymer, either alone or modified by the addition of fillers and/or foaming agents, may be applied by any of the usual techniques (doctoring, rolling, dipping, brushing, spraying) to a great variety of substates. Such substrates include copper, brass, aluminum, steel, and other metals in the form of sheets, fibers, wires, screening; mineral structures such as asbestos; glass in the form of sheets, fibers, foams, fabrics, etc.; polymeric materials such as cellulosic materials (cellophane, wood, paper, etc.) polyolefins (polyethylene, polypropylene, polystyrene, etc.); polyesters (polyethylene terephthalate, etc.), polyamides, polyimides, perfluorocarbon polymers (polytetrafluoroethylene, copolymers of tetrafluoroethylene with hexafluoropropylene, etc.), polyurethanes, in the form of sheets, fibers, foams, woven and non-woven fabrics, screening, etc.; leather sheets; etc. The polymeric substrates can be metallized before coating, or treated with a conventional adhesive or other agent to improve surface receptivity. Films of the final cyclized polymer can be laminated to any of the above substrates, often with the aid of a commercially available adhesive.

The polyamide-esters, when isolated, are found to be colorless or light yellow solids. They have strong infrared bands at 3.0–3.07 microns due to N—H bonds of the amide, 5.8 microns due to C=O bonds of the ester and 6.05 microns due to C=O bonds of the amide.

The invention will be more clearly understood by referring to the examples which follow, Example 1 representing the best mode contemplated for practicing the invention. It is understood that the examples, although illustrating specific embodiments of the present invention, should not be considered limitative of the invention.

The determination of the structure is accomplished by Infrared Spectral Techniques [3] known to those skilled in the art. The majority of the infrared spectra herein were taken on cast films by the use of a Perkin-Elmer Model 21 Spectrophotometer and a Perkin-Elmer Infracord Spectrophotometer.

*Example 1*

To a solution of 29.70 g. (0.15 mole) of 4,4'-diaminodiphenyl methane in 250 g. of freshly distilled N,N-dimethylformamide is added 32.72 g. (0.15 mole) of pyromellitic dianhydride. The dianhydride is added as a dry powder intermittently during a period of 15–30 minutes with efficient stirring. The solution becomes increasingly more viscous and the temperature rises slightly above room temperature. As the last one or two grams of dianhydride is added, the solution becomes viscous and difficult to stir. At this point, more N,N-dimethylformamide is added until a suitable solution viscosity is obtained. This requires 104 g. of additional N,N-dimethylformamide, giving a final solids content of 5%. The inherent viscosity of this polyamide-acid is 1.54 (as measured as 0.5% solution in N,N-dimethylformamide at 30° C.).

Lithium acetate is dissolved in N,N-dimethylformamide/glacial acetic acid (4/1 volume ratio) as a 1.20 molar solution. This solution (12.0 ml.; 0.0144 mole) is added to 20.0 g. of the above polyamide-acid solution. The solution thickens and gels slightly but can be stirred to give a homogeneous mixture containing the lithium salt of the polyamide-acid.

To this solution is added 1.75 g. (0.0144 mole) of allyl bromide. A white solid separates at the interface. This is dissolved readily by stirring. Three additional portions of allyl bromide (1.75 g. each) are added. Some gel remains and the mixture is warmed slightly on a steam bath to dissolve this residue. This solution of the polyamide-acid allyl ester is stored at room temperature until ready for shaping and conversion of polyamide-ester to polyimide.

A film of the polyamide-ester is cast, and dried at 125° C. for 20 minutes. This produces a slightly yellow, tough film, which is leached in water for an hour to remove lithium bromide and then is dried again. This polyamide-acid allyl ester has an inherent viscosity of 0.35 (in sulfuric acid), a modulus of 418,000 p.s.i., an elongation of 4.5% and a tensile strength of 11,750 p.s.i. It is converted by heating into the corresponding polyimide, having an inherent viscosity of 0.40 (in sulfuric acid), a modulus of 528,000 p.s.i., elongation of 5.8% and a tensile strength of 13,300 p.s.i.

*Example 2*

Similar results are obtained by repeating the procedure of Example 1, using the corresponding silver salt of the polyamide-acid instead of the lithium salt. The silver salt is prepared by reaction with silver acetate dissolved in pyridine. The principal difference between these experiments is that reaction of allyl bromide with the silver salt of the polyamide-acid is complicated by the precipitation of silver bromide.

*Examples 3–6*

The allyl esters of the corresponding polyamide-acids are obtained by substituting in the procedure of Example 1 polyamide-acids based upon the following combinations of tetraacid and diamine:

pyromellitic acid and 4,4'-diaminodiphenyl ether;
3,4,3',4'-benzophenone tetracarboxylic acid and 4,4'-diaminodiphenyl methane;
pyromellitic acid and m-phenylene diamine; and
pyromellitic acid and 2,4-diaminocumene.

*Examples 7–8*

The benzyl and methyl esters of the polyamide-acid described in Example 1 are produced readily by substituting benzyl chloride and methyl bromide for allyl bromide in that procedure.

What is claimed is:
1. A process for preparing shapeable polymeric compositions which comprises reacting at least one diamine having the structural formula

$$H_2N—R^1—NH_2$$

---

[3] W. M. D. Bryant and R. C. Voter, Journal of American Chemical Society, 75, 6113 (1953); and F. W. Billmeyer, "Textbook of Polymer Chemistry," Chapter 7, Interscience Publishers, 1957.

wherein R¹ is arylene, the two amino groups of said diamine each attached to separate carbon atoms of R¹, said R¹ being selected from the group consisting of phenylene, naphthylene, biphenylene, anthrylene, furylene, benzfurylene and

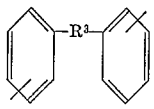

wherein R³ is selected from the group consisting of an alkylene chain having 1–3 carbon atoms,

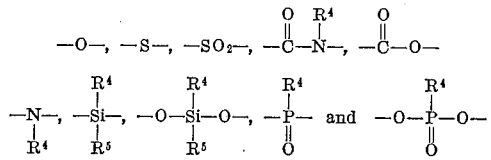

wherein R⁴ and R⁵ are selected from the group consisting of alkyl and aryl; with at least one aromatic tetracarboxylic acid dianhydride of the formula

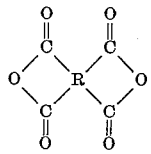

wherein the four carbonyl groups of said dianhydride are directly attached to an aromatic ring of said dianhydride, and wherein R is an aromatic tetravalent organic radical selected from the group consisting of

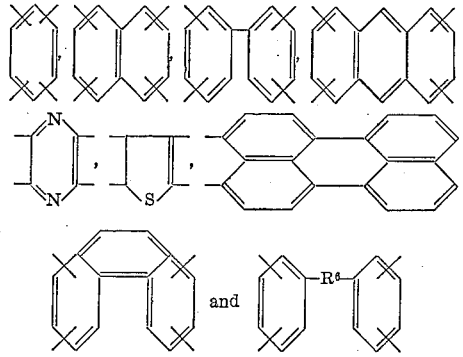

wherein R⁶ is selected from the group consisting of R³ and

in an organic solvent for at least said diamine, said solvent being inert to the system, while maintaining the temperature throughout the reaction sufficiently below 175° C. to form a polymeric composition containing at least about 50% by weight of a polyamide-acid consisting essentially of recurring units of the formula:

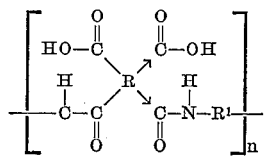

wherein the arrows denote isomerism;
R and R¹ have the same meaning as above; and
n is an integer sufficiently high to provide a polymer having an inherent viscosity of at least 0.1 as measured at 30° C. on an 0.5% by weight solution in N,N-dimethylacetamide;

treating said polyamide-acid with a metal salt of a Group I metal and a carboxylic acid, Group I being defined in Mendeleef's Periodic Table of the Elements, Handbook of Chemistry and Physics (25th ed.), published by Chemical Rubber Publishing Co., said metal salt being used in an amount of 0.1 to 2 moles of said metal per said recurring unit of said polyamide-acid; to form a polymeric composition containing 0.05 to 15% by weight of a polyamide-acid salt consisting essentially of recurring units of the formula

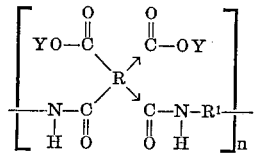

wherein

Y is a Group I metal as defined above;
the arrows denote isomerism; and
R, R¹ and n have the same meaning as above;

treating said polyamide-acid salt, at a temperature in the range of 0°–100° C., with a hydrocarbon halide selected from the group consisting of the chlorides, bromides and iodides of hydrocarbon radicals selected from the group consisting of alkyl, allyl and benzyl; to form a polymeric composition containing a polyamide-ester consisting essentially of recurring units of the formula

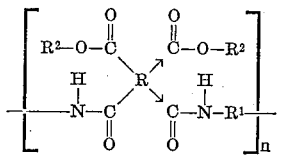

wherein the arrows denote isomerism;
R² is said hydrocarbon radical defined above; and
R, R¹ and n have the same meaning as above.

2. A process as in claim 1 wherein said Group I metal is selected from the group consisting of silver, lithium, cesium, rubidium, potassium and sodium.

3. A process as in claim 1 wherein said metal salt is lithium acetate.

4. A process as in claim 1 wherein said metal salt is silver acetate.

5. A process as in claim 1 wherein said hydrocarbon halide is selected from the group consisting of allyl bromide, methyl bromide and benzyl chloride.

6. A process as in claim 1 wherein said dianhydride is selected from the group consisting of pyromellitic dianhydride and 3,4,3',4'-benzophenone tetracarboxylic dianhydride.

7. A process as in claim 1 wherein said diamine is selected from the group consisting of metaphenylenediamine, 4,4'-diamino-diphenyl methane, 4,4'-diamino-diphenyl ether and 2,4-diaminocumene.

References Cited by the Examiner

UNITED STATES PATENTS 3,179,634    4/1965    Edwards _____ 260—78

SAMUEL H. BLECH, *Primary Examiner.*

WILLIAM H. SHORT, *Examiner.*

H. D. ANDERSON, *Assistant Examiner.*